(No Model.)
T. POORE.
LUBRICATOR.
No. 491,224.   Patented Feb. 7, 1893.
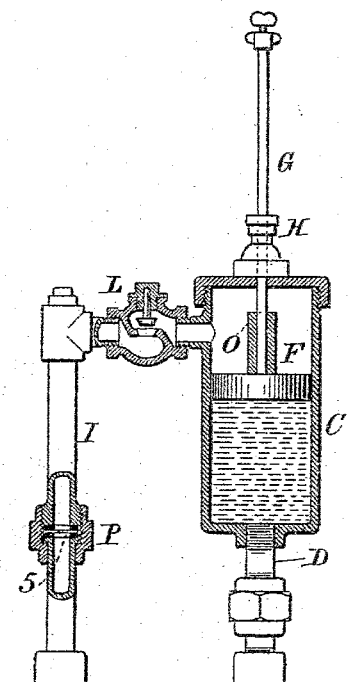
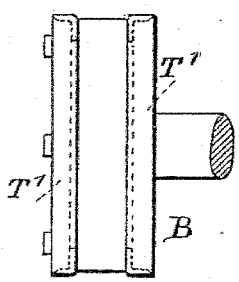
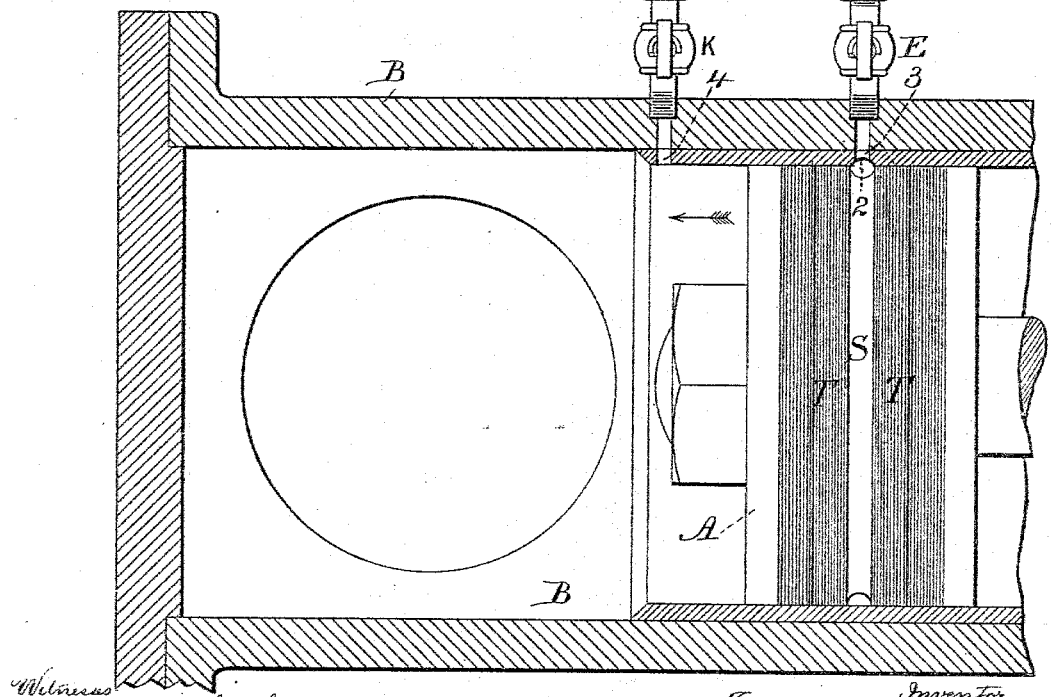
Witnesses
Chas H Smith
J. Staib
Inventor
Townsend Poore
per Lemuel W. Serrell
Atty.
THE NORRIS PETERS CO., PHOTO-LITHO., WASHINGTON, D. C.

UNITED STATES PATENT OFFICE.

TOWNSEND POORE, OF SCRANTON, PENNSYLVANIA.

LUBRICATOR.

SPECIFICATION forming part of Letters Patent No. 491,224, dated February 7, 1893.

Application filed July 18, 1892. Serial No. 440,319. (No model.)

*To all whom it may concern:*

Be it known that I, TOWNSEND POORE, a citizen of the United States, residing at Scranton, in the county of Lackawanna and State of Pennsylvania, have invented an Improvement in Lubricating Apparatus, of which the following is a specification.

Oil cups of various kinds have been employed in lubricating piston rods, pistons, &c., and in instances where a pressure has been exerted for driving the lubricant into a chamber against the pressure therein, such pressure has in many instances caused a waste of the lubricant by supplying the same too quickly or with irregularity.

My present invention is especially intended for use in pumps, but it may be employed for lubricating pistons and similar moving bodies in engines and it is especially intended to be automatic; and with this object in view I provide a holder for the lubricant with connecting pipes and cocks to the place where the lubricant is to be applied, so that the lubricant vessel can be entirely shut off, or the same may be fed gradually and regularly by the action of the pressure.

In the drawings Figure 1 is a section of a pump cylinder showing the piston and the lubricating device, the latter being partially in section. Fig. 2 is a detached view of the regulating disk, and Fig. 3 shows a piston with which this lubricating device may be applied.

A represents the piston or other article to be lubricated and B the cylinder containing the same.

C is the lubricant vessel.

D is a pipe and E a cock leading to the place where the lubricating material is to be applied, and if desired a glass tube may be applied in this pipe D, which will allow the flow of the lubricating material to be observed. This pipe D opens into the bottom of the lubricant vessel C, and there is within such vessel a piston F and a rod G passing through the head and stuffing box H, which rod is availed of in moving the piston F and it also serves as an indicator to denote whether the lubricant vessel is full or more or less empty.

The pipe I and cock K form a second connection to the cylinder B or other place where there is a pressure against which the lubricating material acts when such lubricating material is supplied, and the check valve L forms a connection between the upper part of the pipe I and the lubricant vessel C, such check valve L opening toward the vessel C, and it is advantageous to employ a sleeve or enlargement O, around the piston rod G to prevent the piston F being raised too high, it being necessary to keep such piston F below the lateral inlet from the check valve L.

In the piston A or other article to be lubricated, it is advantageous to introduce an annular groove S between the packings T of fibrous material, but when disadvantageous to provide the annular groove S in the piston, there may be a groove extending more or less around the interior surface, as at 2, where the opening is provided from the pipe D.

Having reference now to the main Fig. 1, let it be presumed that the piston A is pumping water or other liquid; as the piston A approaches the openings 3 and 4 the pressure of the fluid in the cylinder B will be equal through the respective openings 3 and 4, hence the lubricating material will not be forced by such pressure from the vessel C, but as the piston A covers the opening 3, the pressure will be exerted alone through the opening 4 and pipe I upon the piston F to cause the lubricating material to be forced through the opening 3, and such lubricating material will be projected by such pressure as soon as the groove S reaches the opening 3, and in consequence of this groove S being between the packings T, such groove will remain substantially full of lubricating material, and this lubricating material will be supplied into this groove from time to time as the lubricating material is consumed or passes off from the groove S, hence so long as the packings T remain at the opposite sides of the opening 3, the lubricating material cannot be injected by the pressure to a greater extent than that which is needed for filling up such groove S, and when the piston A commences to move in the other direction and there is a minus pressure or suction upon the pipe I, the check valve L will close and prevent the lubricating material being drawn up out of the pipe D into the vessel C, and when the piston passes away from the opening 3 the minus pressure will be exerted with uniformity through both the openings 3 and 4, hence the lubricating material will not be wasted.

If cup leather packings are made use of, as shown at T' in Fig. 3, the groove or channel between such cup leather packings receives the lubricating material in the same way as the annular groove S.

If the parts before mentioned alone were made use of, there is a risk that the feeding of the lubricant would be too rapid; to prevent this difficulty I introduce a disk 5 at the coupling connection P, which disk has ring washers at each side of it, so as to make the same tight, and through this disk is a small hole, and it is preferable that this disk should be made of thin sheet metal, in order that the small hole may be well defined, and according to the size of this hole, so that there is more or less opportunity for the pressure to accumulate in the lubricant vessel above the piston thereof between one reciprocation of the piston A and the next, because when there is a minus pressure in the cylinder B, the lubricating material will not feed, and when there is an excess of pressure the fluid in the cylinder B can only pass gradually through the hole in the disk 5 to act within the lubricant vessel C upon the piston F to force out the lubricating material by the pipe D. This disk 5 can be easily removed by unscrewing the coupling connection P so as to clean the hole in such disk should the same become obstructed.

I claim as my invention.

1. The combination with a cylinder and a piston or similar moving body to be lubricated, of a lubricant vessel, a pipe connecting the upper part of the lubricant vessel with the cylinder or source of pressure upon the lubricant and a pipe for the lubricating material opening into the cylinder and alternately covered and uncovered by the moving body, so that the pressure is exerted to discharge lubricating material upon the moving body when the same intervenes to exclude pressure from the lubricating pipe, substantially as specified.

2. The combination with a cylinder and a moving piston, or other device to be lubricated, of the lubricant vessel and the pipe and cock therefrom to the place to be lubricated, a piston within the lubricant vessel, a second pipe and cock connecting the cylinder or source of pressure to such lubricant vessel above the piston thereof and a disk with a small perforation therein, so that the pressure acts gradually upon the piston and lubricant to project the same at the place to be lubricated when there is a less pressure at the place to be lubricated than there is in the second pipe substantially as set forth.

3. The combination with a cylinder having a piston with packings and a recess between the packings, of a lubricant vessel and a lubricant pipe from the lower part of the same opening through the cylinder to the space between the packings of the piston, and a second pipe between the upper part of the lubricant vessel and the cylinder at a point sufficiently distant to allow the pressure of the fluid in the cylinder to force the lubricant from its vessel into the annular recess of the piston when the same coincides with the lubricant pipe, substantially as set forth.

Signed by me this 9th day of July, 1892.

TOWNSEND POORE.

Witnesses:
JENKIN T. REESE,
JNO. P. ACKER.